US 6,688,098 B2

(12) United States Patent
Rouyer et al.

(10) Patent No.: US 6,688,098 B2
(45) Date of Patent: Feb. 10, 2004

(54) BACKUP LOCKING SYSTEM FOR A THRUST REVERSER DOOR

(75) Inventors: Pascal-Gérard Rouyer, Saint-Aubin Routot (FR); Patrick Gonidec, Toulouse (FR)

(73) Assignee: Hurel Hispano Le-Havre, Gonfreville l'Orcher (FR)

(*) Notice: Subject to any disclaimer, the term of this patent is extended or adjusted under 35 U.S.C. 154(b) by 0 days.

(21) Appl. No.: 10/115,027

(22) Filed: Apr. 4, 2002

(65) Prior Publication Data

US 2002/0144499 A1 Oct. 10, 2002

(30) Foreign Application Priority Data

Apr. 5, 2001 (FR) .............................................. 0104624

(51) Int. Cl.$^7$ ................................................. F02K 1/54
(52) U.S. Cl. ............. 60/226.2; 244/110 B; 239/265.19; 239/265.31
(58) Field of Search ................ 60/226.2, 230; 244/110 B; 239/265.19, 265.23, 265.25, 265.29, 265.31

(56) References Cited

U.S. PATENT DOCUMENTS

| | | | | |
|---|---|---|---|---|
| 3,964,257 A | * | 6/1976 | Lardellier | .................. 60/226.2 |
| 4,437,783 A | | 3/1984 | Halin et al. | ................. 60/226.2 |
| 5,257,840 A | * | 11/1993 | Rouzaud | ..................... 292/201 |
| 5,344,197 A | * | 9/1994 | Rouzaud | ......................... 292/5 |
| 5,495,710 A | | 3/1996 | Servanty | ..................... 60/226.2 |
| 5,547,130 A | * | 8/1996 | Davies | ....................... 60/226.2 |

FOREIGN PATENT DOCUMENTS

EP  0 703 358 A2  3/1996

* cited by examiner

Primary Examiner—Ted Kim
(74) Attorney, Agent, or Firm—Oblon, Spivak, McClelland, Maier & Neustadt, P.C.

(57) ABSTRACT

A backup locking system for a thrust reverser door comprises a catch pivotally mounted by a pivot pin to a fixed structure of the thrust reverser. A hook with a self-locking profile is provided at the free end of said catch for cooperation with a locking interface on the door in the event of failure of the normal locking systems. At its other end remote from said hook, the catch has a heel ending in a part-cylindrical surface which is concentric with said pivot pin. The catch is urged against the locking interface by a piston rod which presses against a front face of said heel under the force of a spring acting on a piston to which said piston rod is attached. When the rod is retracted, a double lever positively moves the catch toward a minimum opening angle, at which point the door can be opened. An unlocking spring causes the full opening of the catch to maximum open position when an opening lever is released. The piston rod presses against the cylindrical surface of the heel when the catch is open, which renders the piston spring inoperative. The opening lever is connected to the catch by link rods and includes a stop to limit the angle of opening of the catch.

10 Claims, 6 Drawing Sheets

BACKUP LOCKING SYSTEM FOR A THRUST REVERSER DOOR

BACKGROUND OF THE INVENTION

1. Field of the Invention

The invention relates to a backup locking system for a thrust reverser door, which system is intended to hold said door in the event of failure of its main locking system, said system comprising a catch mounted so that it can pivot about a first pivot pin on a fixed structure of the thrust reverser between a closed position and an open position and having, at its free end, a hook arranged in a plane perpendicular to said first pivot pin and adapted to cooperate, when said door is in its closed position, with a locking interface secured to said door, and said system also comprising means for keeping said catch against said interface when said door is in its closed position, means for effecting opening of said catch, and means for automatically closing said catch, actuated by said door as it moves toward its closed position.

Turbine engines fitted to aircraft may include thrust reversers which make it possible to reverse the direction of a stream of propulsion gases generated by the turbine engines so as to slow the aircraft down.

These thrust reversers comprise a fixed annular structure surrounding the turbine engine and through which a number of radial openings pass, and movable shutters, also known as doors, capable of closing the radial openings. In a forward thrust configuration, the radial openings are closed, and the stream of propulsion gases generated by the turbine engine is routed toward the rear so as to propel the aircraft. In a reverse thrust configuration, the radial openings are open, the movable shutters or doors are pivoted to the rear and at least partially shut off the gaseous stream flow duct, and the stream of gases comes out through the openings and is directed toward the front of the turbine engine so as to slow the aircraft down. A great deal of safety is required in keeping the doors in the closed position.

The doors are actuated by rams and are kept closed by a main locking system. A backup locking system is provided for the purpose of keeping the door closed in the event of failure of the main locking system, and it is to this backup locking system that the invention relates.

2. Summary of the Prior Art

FR-A-2 765 916 represents the state of the art closest to the invention, and discloses, in FIGS. 17 and 18, a backup locking system which comprises a catch ending in a hook and constantly urged closed by resilient means, means for opening the catch consisting of a ram which moves the catch toward a position of maximum opening, and a spring-loaded keeper intended to keep the catch in the open position. During the door closure movement, the door displaces the keeper to release the catch so that it is returned to the closed position by the reslient means. The keeper comprises a retractable stop against which a mating stop of the catch is able to bear so as to keep the catch in the open position. When the door opens, the keeper is urged by its spring so that the retractable stop lacates under the mating stop once the catch has been opened. When the ram is depressurized, the catch returns backward under the action of the resilient forces and the keeper is set. In the event of wear on the stop and on the mating stop, the catch may close itself prematurely under the action of the resilient means and may prevent subsequent closure of the door.

SUMMARY OF THE INVENTION

It is an object of the invention to provide a locking system as mentioned earlier, in which the catch can close only under the action of automatic closure means actuated by the door during its closure movement.

Accordingly the invention provides a backup locking system for a door of a thrust reverser, which system is intended to hold said door in the event of failure of its main locking means, said system comprising:

a catch mounted so that it can pivot about a first pivot pin on a fixed structure of said thrust reverser between a closed position and an open position, said catch having a free end provided with a hook arranged in a plane perpendicular to said first pivot pin and adapted to cooperate, when said door is in a closed position, with a locking interface secured to said door, and said catch further having a heel at its end remote from said hook, said heel having a lateral face and a part-cylindrical surface centered on the axis of said first pivot pin;

retaining means for keeping said catch against said locking interface when said door is in its closed position;

means for effecting opening of said catch; and means for automatically closing said catch, said means being actuated by said door as it moves toward its closed position;

said retaining means comprising a cylinder secured to said fixed structure, a piston slidably mounted in said cylinder, a piston rod secured to said piston and having an end facing said heel of said catch, and resilient means acting on said piston to urge the end of said piston rod against said lateral face of said heel when said catch is in its closed position; and said means for effecting opening of said catch comprise:

means for permitting the supply of a pressurized fluid to said cylinder to act on said piston in opposition to said resilient means so as to retract said end of said piston rod away from said heel, and means for causing said catch to pivot through at least a minimum opening angle when said piston rod is retracted away from said heel so as to allow the opening of said door, the end of said piston rod facing said part-cylindrical surface of said heel when said catch reaches said minimum opening angle.

Thus, the action of the resilient means is canceled while the piston is being acted upon by the pressurized fluid, and this has the effect of opening the catch to a minimum opening angle, in which position the piston rod faces the part-cylindrical surface of the heel. When the pressurized fluid in the cylinder is released, the end of the piston rod will be pressed against the part-cylindrical surface of the heel by the resilient means, but will not be able to cause inadvertent closure of the catch.

Advantageously, the means for causing the catch to pivot through a minimum opening angle comprise a double opening lever mounted to pivot about a second pivot pin secured to the fixed structure and parallel to the first pivot pin, this double lever being articulated at a first end on the piston rod and having a free end capable of pushing the catch away from said closed position as a result of the retraction of the piston rod. Thus, the catch is opened positively by the ram.

These means may further comprise an unlocking spring inserted between the catch and the fixed structure. In this case, the resilient means provided in the ram exerts on the catch a torque which opposes and exceeds the torque exerted by the unlocking spring.

Thus, the means for causing the catch to pivot through at least a minimum opening angle are redundant, as a safety measure.

As a preference, said means of automatically closing said catch comprise a closure lever having two ends and mounted to pivot at one of its ends on a third pivot pin secured to said fixed structure and parallel to said first pivot pin, this closure lever being connected to said catch by a link rod, the free end of said closure lever lying in the path of a fitting secured to said door and intended to actuate said lever during a final phase of closure of said door so as to return said catch to said closed position.

If an unlocking spring is provided, then this spring opens said catch to a maximum position of opening, when said fitting moves away from said free end of said closure lever as the door is being opened.

The position of maximum opening is defined by a mechanical stop provided on the closure lever. In this position of maximum opening, the head of the piston rod presses against the part-cylindrical surface of the heel when the ram is depressurized. The resilient means are then inoperative. When the door is closed, the fitting actuates the closure lever and this returns the catch to the closed position. The head of the piston rod slides along the part-cylindrical surface and when it reaches the lateral face of the heel, the resilient means act to apply the catch against the locking interface.

DESCRIPTION OF THE PREFERRED EMBODIMENT

Figure 1:
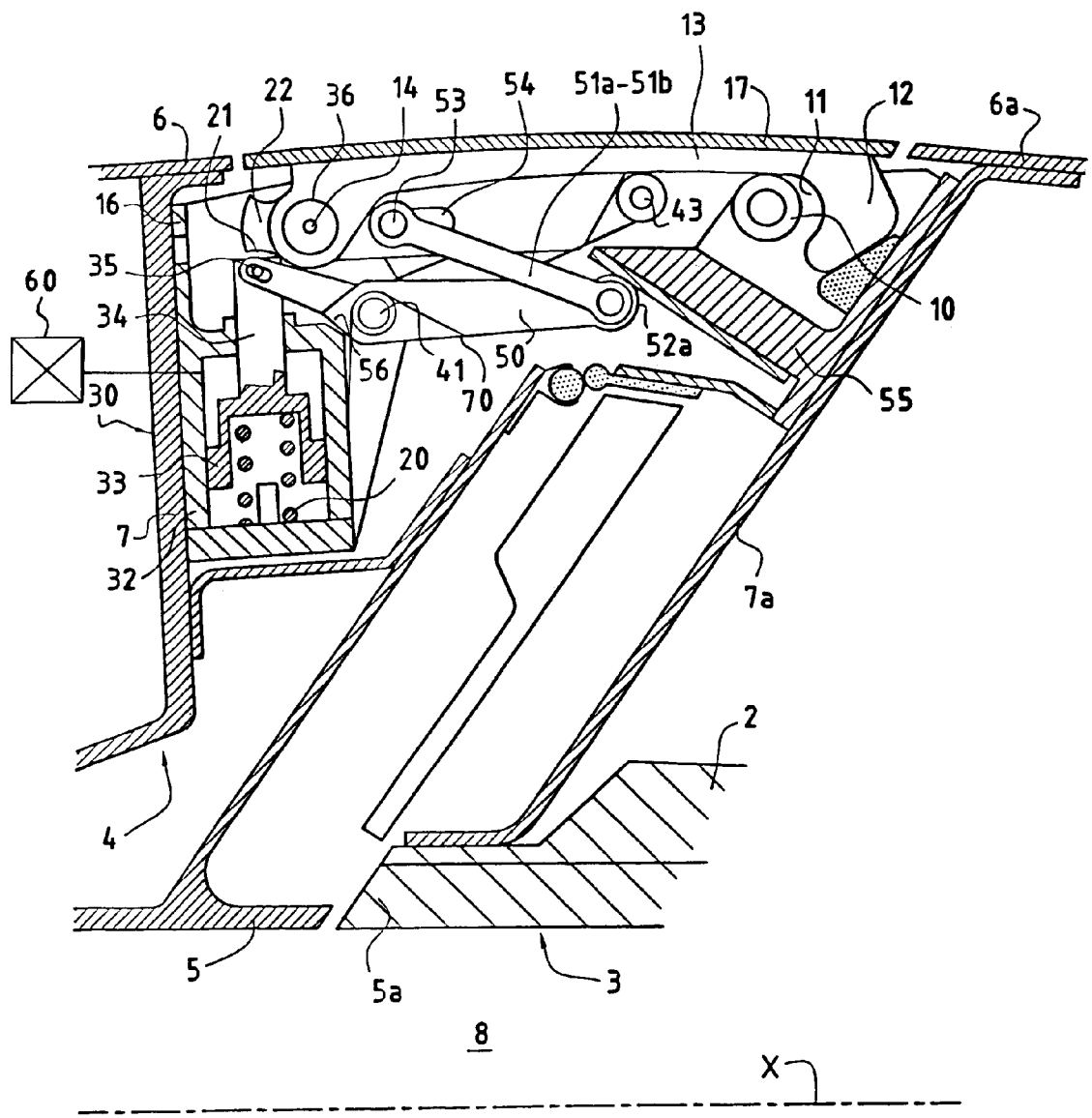
FIG. 1 is a section, in a plane passing through the axis of a turbine engine, of one embodiment of a backup locking device in accordance with the invention, showing the thrust reverser door in a closed position.

The drawings show a backup locking device 1, which we will call a lock, capable of restraining a pivoting door 2 of a thrust reverser in the event of failure of the normal devices that lock this door 2.

In a closed position, the door 2 blocks off an opening 3 in a nacelle 4 which surrounds a turbine engine of axis X.

The nacelle comprises, in the known way, an internal wall 5 delimiting a passage 8 through which a propulsive stream of gas flows and an aerodynamically shaped external wall 6, these walls 5 and 6 being connected at the opening 3 by stiffeners 7.

The door 2 also comprises an internal wall 5a and an external wall 6a which are connected at the front by stiffeners 7a. When the door 2 is in the closed position, the walls 5a and 6a are, respectively, in the continuation of the walls 5 and 6 of the nacelle 4, so as to avoid turbulence in the passage 8 and in the stream of air external to the nacelle 4.

The door 2 can pivot about a pin situated downstream in the passage 8, so as to shut off the passage 8 at least partially and deflect the propulsive stream of gas toward the opening 3 and toward the front of the nacelle 4, so as to slow down an aircraft equipped with said turbine engine, at least during a phase of running along a runway after landing.

The thrust reverser generally comprises several doors arranged circumferentially around the nacelle 4 and actuated in unison by control means. Normal locking means, not shown in the drawings, are provided for locking the doors 2 in the closed position.

Figure 7:
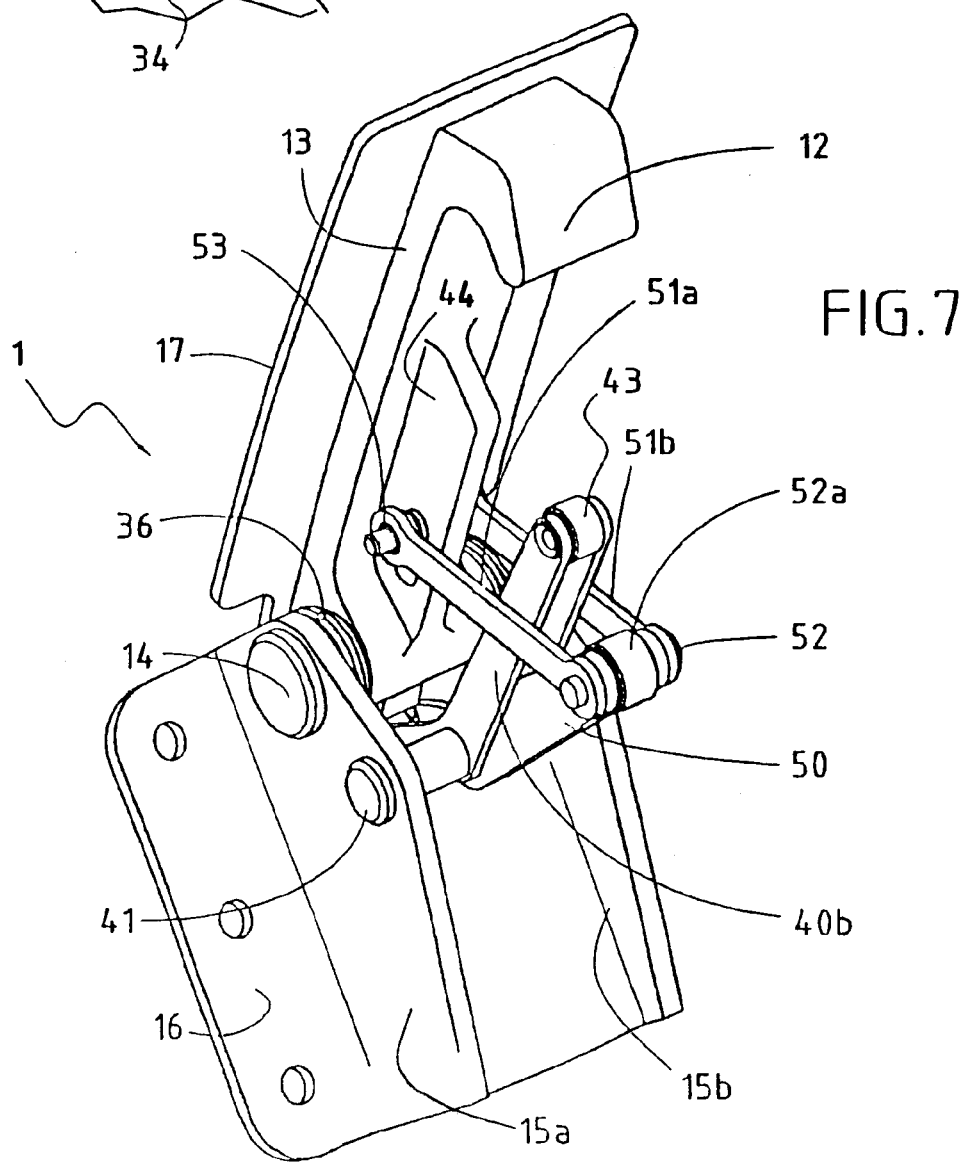
FIG. 7 is a perspective view of the backup locking device in the open position.
Figure 6:
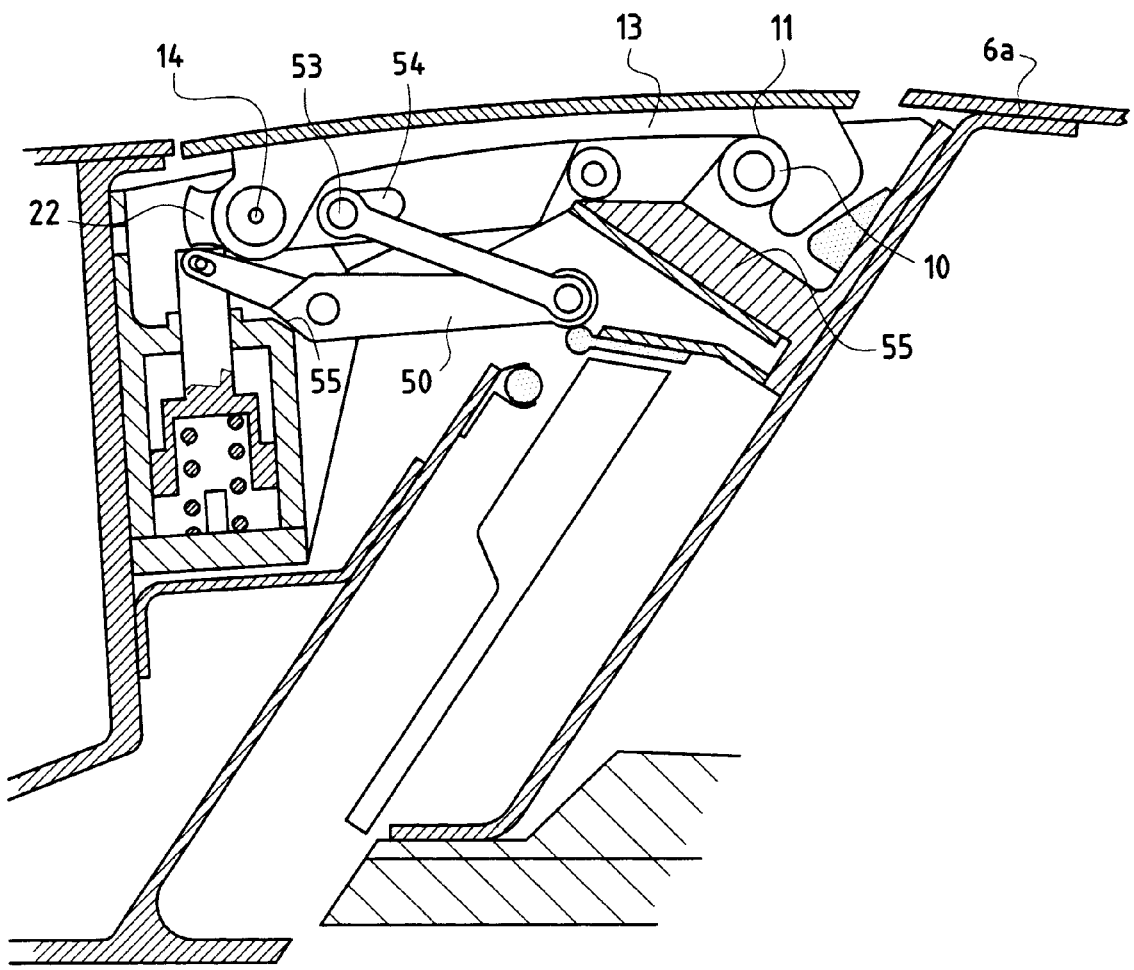
FIG. 6 shows the backup locking device of FIG. 1 in the event of failure of normal locking devices of the thrust reverser door.

The backup lock 1 which is the subject of the present invention is used to restrain the door 2 in an almost closed position in the event of failure of the normal locking means. FIG. 6 shows the arrangement of the backup lock 1 when the door 2 is inadvertently unlocked. As can be seen in this FIG. 6, the door 2 comprises a locking interface 10 consisting of a rod secured to the stiffener 7a, which becomes lodged in a housing 11 of a hook 12 with a self-closing profile, provided at the free end of a catch 13 mounted so that it can rotate about a pivot pin 14 mounted on a clevis 15a, 15b (see FIG. 7) of a mounting plate 16 fixed to the stiffeners 7. The pivot pin 14 is perpendicular to the axis X of the turbine engine and arranged near the external wall 6 of the nacelle 4. The hook 12 is directed toward the inside of the nacelle 4, and in such a way that the catch 13 can pivot toward the outside of the nacelle 4. This catch 13 is covered by a plate 17 which, when the lock 1 is in the closed position, lies in the continuity of the external walls 5 and 5a. It is thus possible to check visually from the outside whether the catch 13 is in the closed position or the open position.

When the normal means of locking the door 2 are operating correctly, as is shown in FIG. 1, the locking interface 10 is arranged forward of the hook 12 and the internal face of the catch 13 presses constantly against the locking interface 10, by virtue of the torque exerted by resilient means consisting of a spring 20 which press against a lower face 21 of a heel 22 provided at the opposite end of the catch 13 to the hook 12 on the other side of the pivot pin 14.

Thus, in the event of failure of the normal means of locking the door 2, the catch 13 still presses against the locking interface 10 secured to the door 2, and the hook 12 restrains this locking interface 10 so as to keep the door 2 in an almost closed position when the door moves away by a predetermined distance from its locked position.

Means 30 of actuating the catch 13 are provided for moving the hook 12 away from the path 31 of the locking interface 10 when the door 2 is opened.

Figure 2:
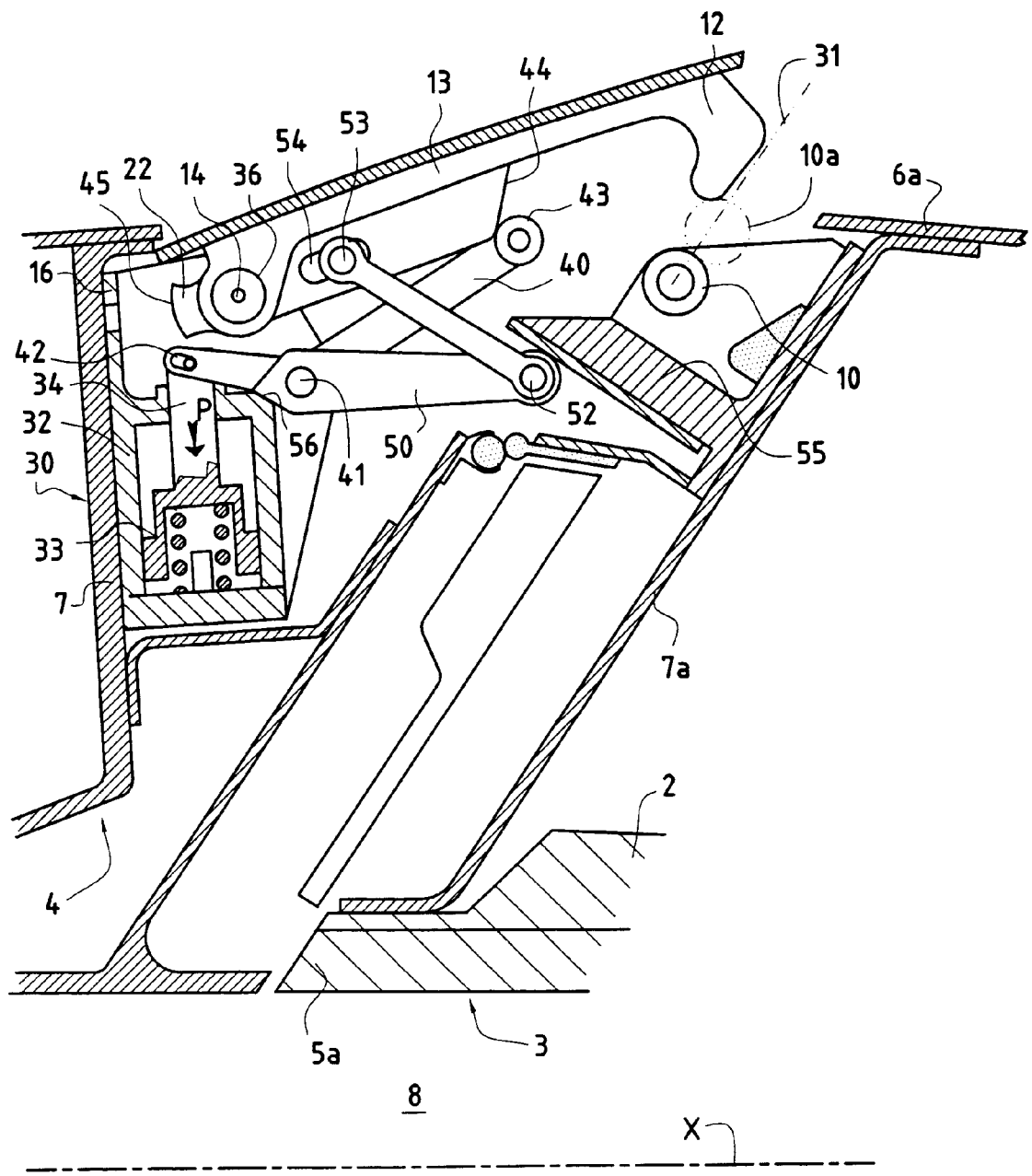
FIG. 2 shows the backup locking device of FIG. 1 in a position of minimum opening during opening of the thrust reverser door.

FIG. 1 shows the catch 13 in the closed position, the door 2 being locked, and FIG. 2 shows the catch 13, after actuation by the means 30, and the door 2 being ready to open.

The actuating means 30 comprise a hydraulic ram, the cylinder 32 of which is fixed to the mounting plate 16, and the piston 33 of which is loaded by the spring constituting the resilient means 20. The piston 33 drives in translation a piston rod 34 directed toward the heel 22. An end of the piston rod 34 which is equipped with a roller 35 is pressed against the lower face 21 of the heel 22, in the absence of pressurizing fluid in the upper chamber of the cylinder 32, under the action of the spring 20 arranged in the lower chamber of the cylinder 32, when the catch 13 is in the closed position. The catch 13 in this case is locked (FIG. 1).

If, starting out from this position in which the catch 13 is locked, the piston 33 is subjected to a pressurizing fluid, for example a hydraulic fluid, which acts against the action of the spring 20, the piston rod 34 retracts into the cylinder 32 and the roller 35 moves away from the heel 22 by a sufficient distance to allow the heel 22 to pivot. FIG. 1 shows an example of a means 60 for permitting a supply of the pressurized fluid to the cylinder 32 to act on the piston rod 34. When the piston rod 34 is in this position, the catch 13 is rocked outward by a minimum angle of rotation, so as to allow the locking interface 10 to move along the path 31 shown in FIG. 2.

The catch 13 is rocked by two redundant means. First of all, an unlocking spiral spring 36 is mounted around the pivot pin 14. This spiral spring 36 bears, on the one hand, against the catch 13 and, on the other hand, against the fixed structure of the nacelle 4, and tends to rock the catch 13 toward the outside of the nacelle 4.

Furthermore, a double lever 40 mounted to pivot on the clevis 15a and 15b about a pivot pin 41 parallel to the pin 14, one arm 40a of which is articulated, with play, by virtue of a slot 46, to a pin 42 of the roller 35 and the other arm 40b of which is equipped at its end with a roller 43, is actuated by the movement of the piston rod 34 so as to positively open the catch 13.

When the catch 13 is in the closed position, the roller 43 presses against the lower face of the catch 13. The latter is equipped with a ramp 44 along which the roller 43 runs as the piston rod 34 retracts. The size of the ramp 44, of the roller 43 and their positions are defined so as to guarantee that, at the end of the travel of the piston 33, the catch 13 will be in a position of minimum opening. This minimum position must make it possible, in the event of failure of the unlocking spring 36, for the door 2 to be able to be opened, preventing any possibility of the hook 12 retaining the locking interface 10 in the position 13a as shown in FIG. 2.

Figure 4:
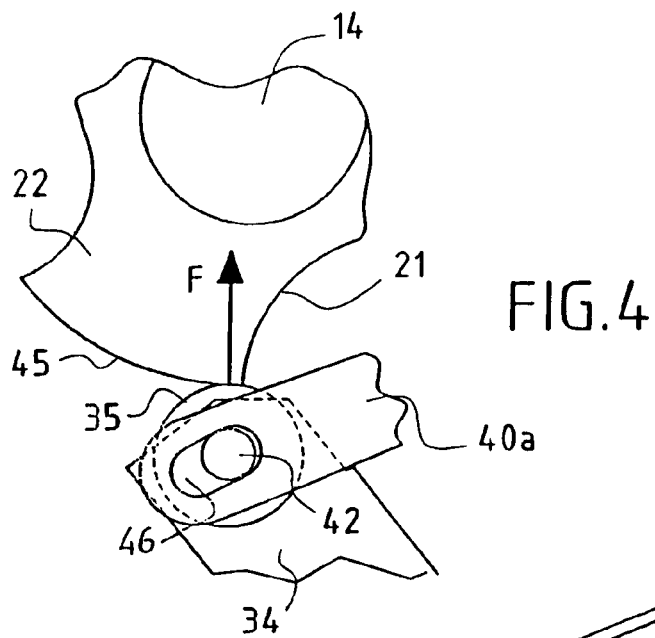
FIG. 4 shows, on a larger scale, a detail of the backup locking device of FIG. 1, showing the piston rod against the heel of the catch when the catch is in a position of maximum opening.

The heel 22 of the catch 13 has, at its free end, a cylindrical surface 45 of revolution about the pivot pin. The arrangement of this cylindrical surface 45 and of the lower face 21 of the heel 22, and the distance through which the piston rod 34 retracts and the positioning of this piston rod are defined so that when the catch 13 is in its position of minimum opening, defined positively by the pivoting of the double lever 40, the roller 35 comes to press against the cylindrical surface 45 when the upper chamber of the cylinder 32 is depressurized. In this position, the spring 20 presses the roller 35 against the cylindrical wall 45 and the roller exerts on the cylindrical wall 45 a force F directed toward the pivot pin 14 of the catch 13, as shown in FIG. 4. When the catch 13 has reached its position of minimum opening, the resilient means 20 become inoperative.

If the spiral spring 36 is operating correctly, this spring 36 will tend to urge the catch 13 toward the outside of the nacelle 4 beyond the position of minimum opening of the catch 13.

Means are also provided for automatically returning the catch 13 to the closed position when the door 2 is closed.

For this purpose, the lock 1 is equipped with a closure lever 50 articulated to the pivot pin 41 of the double lever 40 and directed toward the stiffener 7a. Two parallel link rods 51a and 51b are each articulated by one of their ends to a free end 52 of the closure lever 50 and comprise, at their other end, a pin 53 which slides in a slot 54 made in the catch 13. The door 2 is equipped with a fitting 55 capable of pressing against a roller 52a, provided at the free end 52 of the closure lever 50, during the closing movement of the door 2, so as to return the catch 13 to its closed position.

When the catch 13 is in the closed position as shown in FIG. 1, the free end 52 of the closure lever 50 is kept pressed against the lower face of the fitting 55 by a torsion spring 70 installed around the pivot pin 41, and the pin 53 of the link rods 51a and 5b is arranged in the slot 54 as close as possible to the pivot pin 14 of the catch 13.

When, under the action of the pressurizing fluid, the piston 33 and the piston rod release the catch 13, the pin 53 slides in the slot 54 and the latter is dimensioned so that the catch 13 can position itself with certainty in the position of minimum opening shown in FIG. 2.

Figure 3:
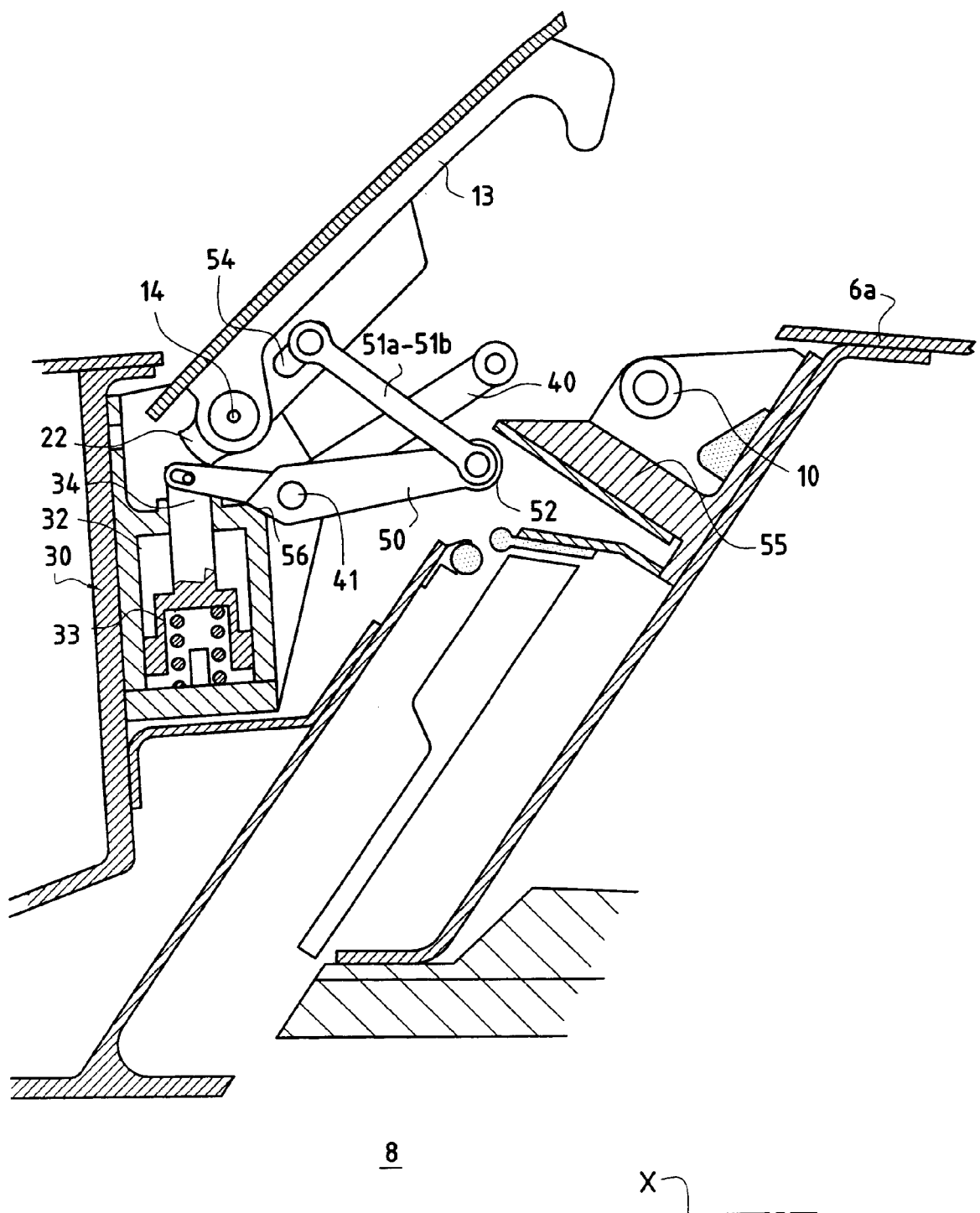
FIG. 3 shows the backup locking device of FIG. 1 in a position of maximum opening of the thrust reverser door.

During the initial phase of opening the door 2, the fitting 55 moves away from the stiffener 7 of the nacelle 4, but the free end 52 of the closure lever remains pressing against the lower face of the fitting 55. Next, as the fitting 55 moves away from the free end 52 of the closure lever 50, the catch is urged outward by the unlocking spring 36, as is shown in FIG. 3. In order to make sure that the free end 52 of the closure lever 50 remains in the return path of the fitting 55, so as to allow the catch 13 to close during the closing movement of the door 2, the travel of the closure lever 50 is limited by a mechanical stop 56 provided on the closure lever 50 and which collaborates with a mating stop provided on the fixed surface of the lock 1, the cylinder 32 or the clevis 15a, 15b for example. In this position of maximum travel of the closure lever 50, shown in FIG. 3, the pin 53 of the link rods 51a and 51b is positioned at the end of the slot 54 away from the pivot pin 14, and this limits the maximum opening of the catch 13. In this position of maximum opening, the roller 35 situated at the end of the piston rod 34 is bearing against the cylindrical surface 45 of the heel 22.

Figure 5:
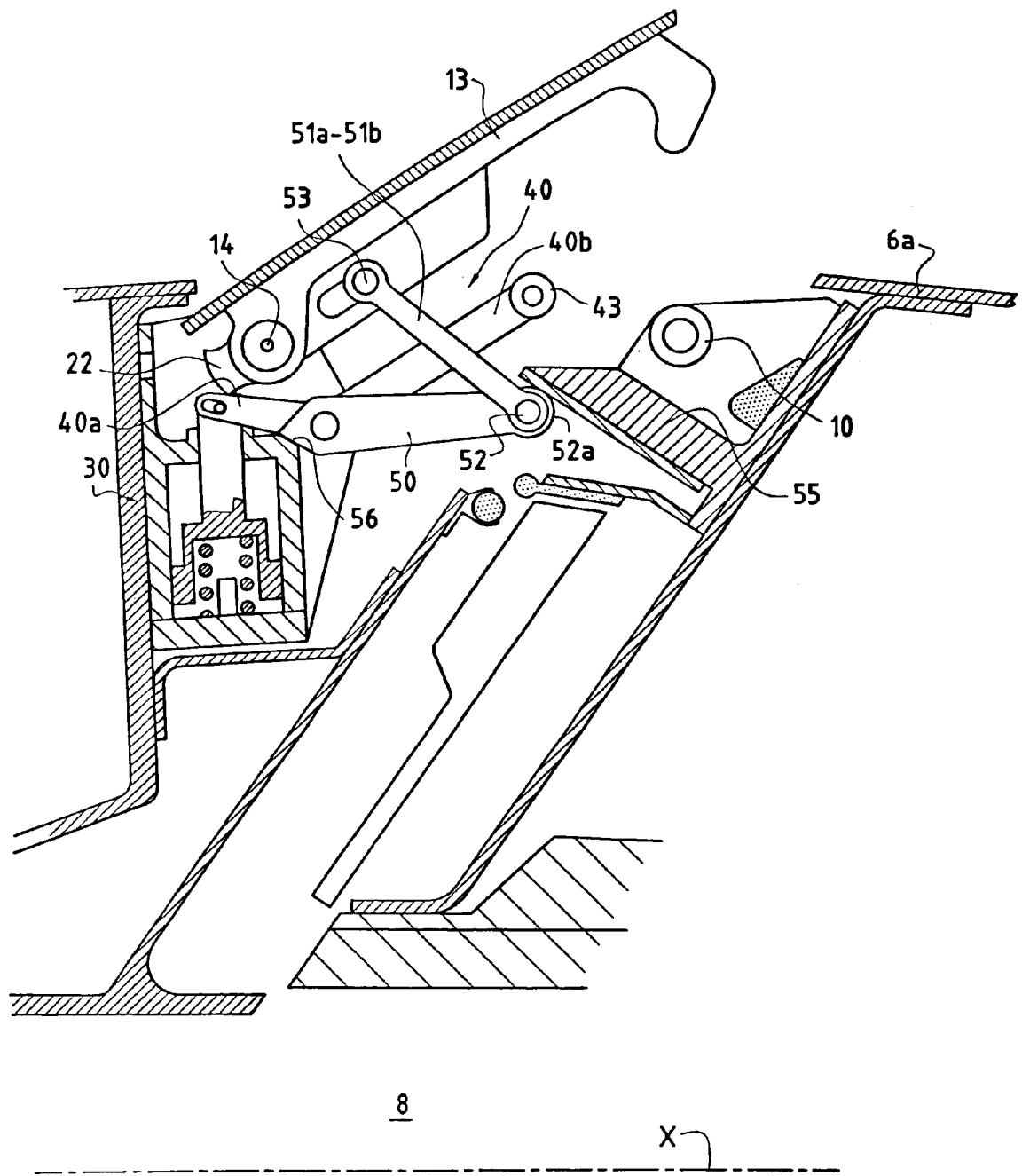
FIG. 5 shows the backup locking device of FIG. 1 during a final phase of closing of the thrust reverser door.

During a closing movement of the door 2, shown in FIG. 5, the fitting 55 will come to press against the free end 52 of the closure lever 50, then the closure lever 50 will pivot in the clockwise direction, the link rods 51a and 51b return the catch 13 to the closed position. During the start of the closure phase, the roller 35 rolls along the cylindrical surface 45 of the heel 22, and the spring 20 is inoperative. When the catch 13 has moved beyond the position of minimum opening which is shown in FIG. 2, the locking interface 10 finds itself facing the end of the hook 12. The roller 35 then leaves the cylindrical surface 45 and comes to press against the lower face 21 of the heel 22. In this position the spring 20 becomes operative and the catch 13 presses positively against the locking interface 10.

The spring 20 is chosen so that the torque it exerts on the catch 13 is greater than the sum of the opening-assistance moments generated both by the unlocking spring 36 and the spring urging the closure lever 50.

We claim:

1. A backup locking system for a door of a thrust reverser, which system is intended to hold said door in the event of failure of its main locking means, said system comprising:

a catch mounted so that it can pivot about a first pivot pin on a fixed structure of said thrust reverser between a closed position and an open position, said catch having a free end provided with a hook arranged in a plane perpendicular to said first pivot pin and adapted to cooperate, when said door is in a closed position, with a locking interface secured to said door, and said catch further having a heel at its end remote from said hook, said heel having a lateral face and a part-cylindrical surface centered on the axis of said first pivot pin;

retaining means for keeping said catch against said locking interface when said door is in its closed position;

means for effecting opening of said catch; and means for automatically closing said catch, said means being actuated by said door as it moves toward its closed position;

said retaining means comprising a cylinder secured to said fixed structure, a piston slidably mounted in said cylinder, a piston rod secured to said piston and having an end facing said heel of said catch, and resilient means acting on said piston to urge the end of said piston rod against said lateral face of said heel when said catch is in its closed position; and said means for effecting opening of said catch comprise:
means for permitting the supply of a pressurized fluid to said cylinder to act on said piston in opposition to said resilient means so as to retract said end of said piston rod away from said heel; and
means for causing said catch to pivot through at least a minimum opening angle when said piston rod is retracted away from said heel so as to allow the opening of said door, the end of said piston rod facing said part-cylindrical surface of said heel when said catch reaches said minimum opening angle.

2. A system as claimed in claim 1, wherein said means for causing said catch to pivot through a minimum opening angle comprise an unlocking spring inserted between said catch and said fixed structure.

3. A system as claimed in claim 1, wherein said means for causing said catch to pivot through a minimum opening angle comprise a double opening lever mounted to pivot about a second pivot pin secured to said fixed structure and parallel to said first pivot pin, said double opening lever having a first end articulated to said piston rod and having a free end capable of pushing said catch away from said closed piston as a result of the retraction of said piston rod.

4. A system as claimed in claim 3, wherein said double opening lever is articulated to said piston rod with play.

5. A system as claimed in claim 3, wherein said means for causing said catch to pivot through a minimum opening angle further comprise an unlocking spring inserted between said catch and said fixed structure.

6. A system as claimed in claim 1, wherein said means for automatically closing said catch comprise a closure lever having two ends and mounted to pivot at a first one of its ends on a second pivot pin secured to said fixed structure parallel to said first pivot pin, and a link rod connecting the second end of said closure lever to said catch, said second end of said closure lever lying in the path of a fitting secured to said door and adapted to engage said lever during a final phase of closure of said door so as to return said catch to its closed position.

7. A system as claimed in claim 6, wherein when said fitting moves away from said second end of said closure lever, said catch is urged toward a maximum open position by an unlocking spring inserted between said catch and said fixed structure.

8. A system as claimed in claim 7, wherein said maximum open position of said catch is defined by a mechanical stop.

9. A system as claimed in claim 8, wherein said mechanical stop is on said closure lever.

10. A system as claimed in claim 6, wherein said end of said piston rod presses against said part-cylindrical surface of said heel when said door fitting is moved away from said second end of said closure lever.

* * * * *